United States Patent [19]

Tanaka

[11] Patent Number: 5,029,208

[45] Date of Patent: Jul. 2, 1991

[54] CIPHER-KEY DISTRIBUTION SYSTEM

[75] Inventor: Kazue Tanaka, Tokyo, Japan

[73] Assignee: NEC Corporation, Tokyo, Japan

[21] Appl. No.: 488,952

[22] Filed: Mar. 5, 1990

[30] Foreign Application Priority Data

| Mar. 3, 1989 | [JP] | Japan | 1-52352 |
| Mar. 3, 1989 | [JP] | Japan | 1-52353 |
| Mar. 3, 1989 | [JP] | Japan | 1-52354 |
| Mar. 30, 1989 | [JP] | Japan | 1-80501 |

[51] Int. Cl.$^5$ .............................................. H04L 9/00
[52] U.S. Cl. ........................................ 380/21; 380/30
[58] Field of Search ............................ 380/21, 30, 46

[56] References Cited

U.S. PATENT DOCUMENTS

| Re. 33,189 | 3/1990 | Lee et al. | 380/21 |
| 4,200,700 | 4/1980 | Mäder | 521/186 |
| 4,228,321 | 10/1980 | Flanagan | 380/21 |
| 4,731,840 | 3/1988 | Mniszewski et al. | 380/21 |
| 4,876,716 | 10/1989 | Okamoto | 380/21 |
| 4,926,478 | 5/1990 | Gruenberg | 380/21 |
| 4,933,971 | 6/1990 | Bestock et al. | 380/21 |

OTHER PUBLICATIONS

Diffie, et al, "New Direction in Cryptography", IEEE Transaction on Information Theory, vol. 22, No. 6, p. 644, Nov. 1976.

Okamoto, "Key Distribution Systems Based on Identification Information", Advances in Cryptology—Crypto '87, pp. 196–202.

Okamoto, et al, "Identity-Based Information Security Management System for Personal Computer Networks", IEEE Journal on Selected Areas in Communications, vol. 7, No. 2, 1989.

Okamoto, et al, "Key Distribution System Based on Identification Information", IEEE/IEICE Global Telecommunications Conference 1987, Nov. 15–18, Tokyo, Japan.

Primary Examiner—Thomas H. Tarcza
Assistant Examiner—David Cain
Attorney, Agent, or Firm—Foley & Lardner

[57] ABSTRACT

A cipher-key distribution system used in a one-way communication from a first party to a second party. The cipher-key distribution system is composed of a first subsystem, a second subsystem, and a common file which stores information publically accessible by the first and second subsystems. The first subsystem generates a cipher-key based on a constant, receiving party identifying information, a random number, and public information from the common file. The first subsystem also generates a key distributing code based on a constant, a random number and a first secret information and transfers the key distributing code to a second subsystem. The second subsystem receives the key distributing code and information for identifying the first party and generates a second cipher-key identical to the cipher-key generated by the first subsystem. The second cipher-key is created from the information for identifying the first party, a second secret information, and the key distributing code. The first subsystem, instead of generating and transmitting a key distributing code, may simply transmit information for identifying the first communicating party to the second subsystem.

5 Claims, 11 Drawing Sheets

CIPHER-KEY DISTRIBUTION SYSTEM

DETAILED DESCRIPTION OF THE INVENTION

The present invention relates to a key distribution system for the one-way communication, from a sending party to a receiving party, of a cipher-key for use in conventional cryptosystems.

BACKGROUND OF THE INVENTION

Well-known prior art key distribution systems include the Diffie-Hellman (DH) system and the ID-based system. The former is disclosed in Diffie and Hellman, "New Direction in Cryptography" in the IEEE Transaction on Information Theory, Vol. 22, No. 6, p. 644. According to the DH system which stores public information for each communicating party, if party A is to communicate with party B in cipher, A prepares a cipher-key from B's public information $Y_B$ and its own secret information $X_A$. This method, however, allows another party to pretend to be an authorized party by illegitimately altering public information.

For information on the latter, the ID-based key distribution system, reference may be made to the U.S. Pat. No. 4,876,716, uses public identification information such as the name of each communicating party to prepare a cipher-key. The ID-based system is immune from illegitimate alteration of public information. As it requires two-way communication, however, there is the problem of imposing large overhead on both the sending and the receiving parties if a cryptogram is to be sent by an existing mail system.

The DH key distribution system also involves the problem of letting an unauthorized receiver pretend to be an authorized user by altering public information.

SUMMARY OF THE INVENTION

An object of the present invention is to provide a system cleared of the above mentioned disadvantages.

A first system according to one aspect of the invention is a cipher-key distribution system for distributing a cipher key for use in cipher communication by one party with another, provided with:
  a common file for storing public information in a position indicated by receiving party identifying information, and first and second subsystems, wherein:
  said first subsystem comprises:
  reading means for reading said public information out of said common file;
  random number generating means for generating random numbers;
  first cipher-key generating means for generating a cipher key on the basis of a constant, said receiving party identifying information given from outside, a random number generated by said random number generating means and the public information read out by said reading means;
  secret information holding means for holding the secret information of the communicating party using this subsystem;
  key distributing code generating means for generating a key distributing code on the basis of said constant, said random number and the secret information given from said secret information holding means; and
  transmitting means for transmitting the key distributing code generated by the key distributing code generating means and the information for identifying the communicating party, and
  said second subsystem comprises:
  receiving means for receiving the key distributing code and the identifying information from said transmitting means of the first subsystem;
  constant holding means for holding the constant;
  secret information holding means for holding the secret information of the communicating party using this subsystem; and
  second cipher-key generating means for generating a cipher key, which is identical with the cipher-key generated by said first cipher-key generating means, on the basis of the key distributing code and identifying information from said receiving means, the constant from said constant holding means and the secret information from said secret information holding means.

A second system according to another aspect of the invention is a cipher-key distribution system for distributing a cipher key for use in cipher communication by one party with another, provided with:
  a common file for storing public information in a position indicated by receiving party identifying information, and first and second subsystems, wherein:
  said first subsystem comprises:
  first reading means for reading said public information out of said common file;
  secret information holding means for holding the secret information of the communicating party using this subsystem;
  first cipher-key generating means for generating a cipher key on the basis of a constant, receiving party identifying information given from outside, the public information read out by said first reading means and the secret information from said secret information holding means; and
  transmitting means for transmitting the information for identifying the communicating party using this subsystem, and
  said second subsystem comprises:
  receiving means for receiving the identifying information given from said transmitting means;
  constant holding means for holding the constant;
  secret information holding means for holding the secret information of the communicating party using this subsystem;
  second reading means for reading said public information out of said common file, and
  second cipher-key generating means for generating a cipher key, which is identical with the cipher-key generated by said first cipher-key generating means, on the basis of the identifying information from said receiving means, the constant from said constant holding means, the secret information from said secret information holding means, and the public information given from said second reading means.

A third system according to still another aspect of the invention has, within the first subsystem of the first system, a personal file for storing part of the information stored in the common file.

A fourth system according to yet another aspect of the invention has, within the first subsystem or subsystems of at least one of the first, second and third systems, verifying means for verifying the information read out of the common file.

BRIEF DESCRIPTION OF THE DRAWINGS

Other features and advantages of the present invention will become more apparent from the following detailed description when taken in conjunction with the accompanying drawings in which.

In the figures, the same reference numerals denote respectively the same constituent elements.

DETAILED DESCRIPTION OF THE PREFERRED EMBODIMENTS

Figure 1:
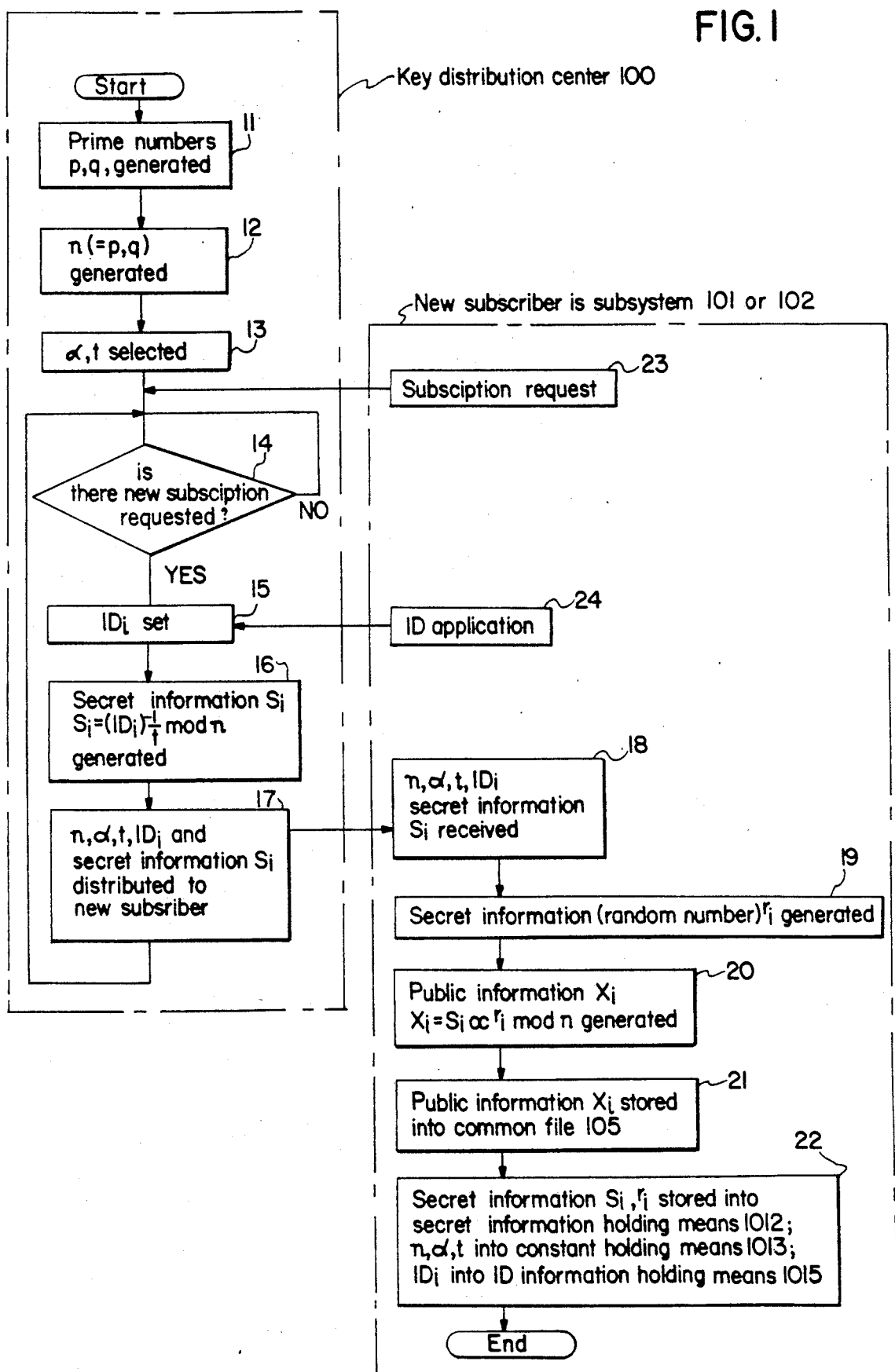
FIG. 1 shows preparatory steps for first, third and fifth preferred embodiments of the invention.

Referring to FIGS. 2, 4, 8 and 10, each of the preferred embodiments of the present invention illustrated therein includes a first subsystem 101, a second subsystem 102, an insecure cryptogram communication channel 103 for transmitting a cryptogram from the subsystem 101 to the subsystem 102, an insecure intermediate key communication channel 104 for transmitting a code $Y_A$ for distributing a coded key from the subsystem 101 to the subsystem 102, a common file 105 for storing public information $X_i$ containing identifying information $ID_i$, and a line 106 for connecting the common file 105 and the subsystem 101. The subsystems 101 and 102 are used by communicating parties A and B, respectively.

First will be described in detail the procedure of registration into the common file 105, which is one of the characteristic features of the present invention, with reference to FIGS. 1 through 3.

This action takes place before a cryptogram is transmitted.

Figure 2:
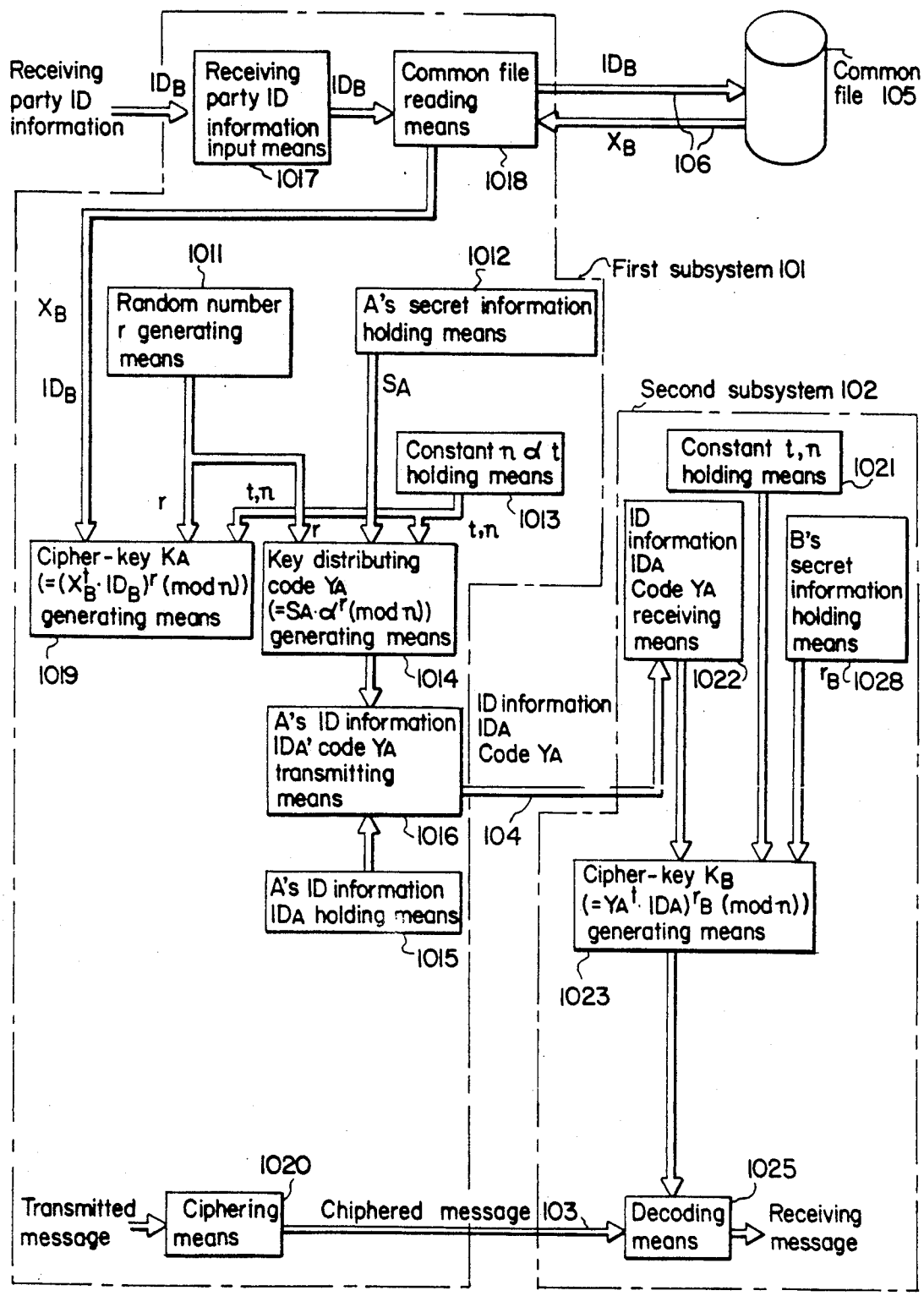
FIG. 2 illustrates the first preferred embodiment of the invention.

FIG. 1 shows how preparations are made for the generation of cipher-keys $K_A$ and $K_B$ in a preferred embodiment of the invention.

First, large prime numbers p and q are selected (step 11). Then the product n of these two large prime numbers p and q is calculated (step 12). Further, t is selected as a number mutually prime to $(p-1)\cdot(q-1)$, and $\alpha$ is selected as a positive integer smaller than n, which becomes a primitive element GF(p) and GF(q) (step 13). After that, either the subsystem 101 or 102 on the part of a new subscriber gives a subscription request 23 as required. At a key distribution center 100, an inquiry is made as to the presence or absence of a subscription request, and the inquiry is continued until a subscription request is given (step 14). When the inquiry at step 14 finds an affirmative reply, identifying information $ID_i$ for the pertinent subscriber i is set in response to an ID application 24 by the subsystem 101 or 102 (step 15). Next, by using this identifying information $ID_i$, secret information $S_i$ is figured out by the following equation (step 16):

$$S_i = (ID_i)^{-1/t} \mod n$$

where a(mod b) means the remainder of the division of a by b. To the new subscriber i are distributed n, $\alpha$, t, $ID_i$ and $S_i$, generated at these steps 12, 13 and 16 (step 17).

The system on the part of the new subscriber i receives n, $\alpha$, t, $ID_i$ and the secret information $S_i$ distributed at step 17 (step 18). Next, another piece of secret information (a random number) $r_i$ is generated (step 19). Then, on the basis of the received secret information $S_i$, the newly generated information $r_i$ and $\alpha$, which became a primitive element at step 13, public information $X_i$ is generated by the following equation (step 20):

$$X_i = S_i \cdot \alpha^{r_i} \mod n$$

Figure 3:
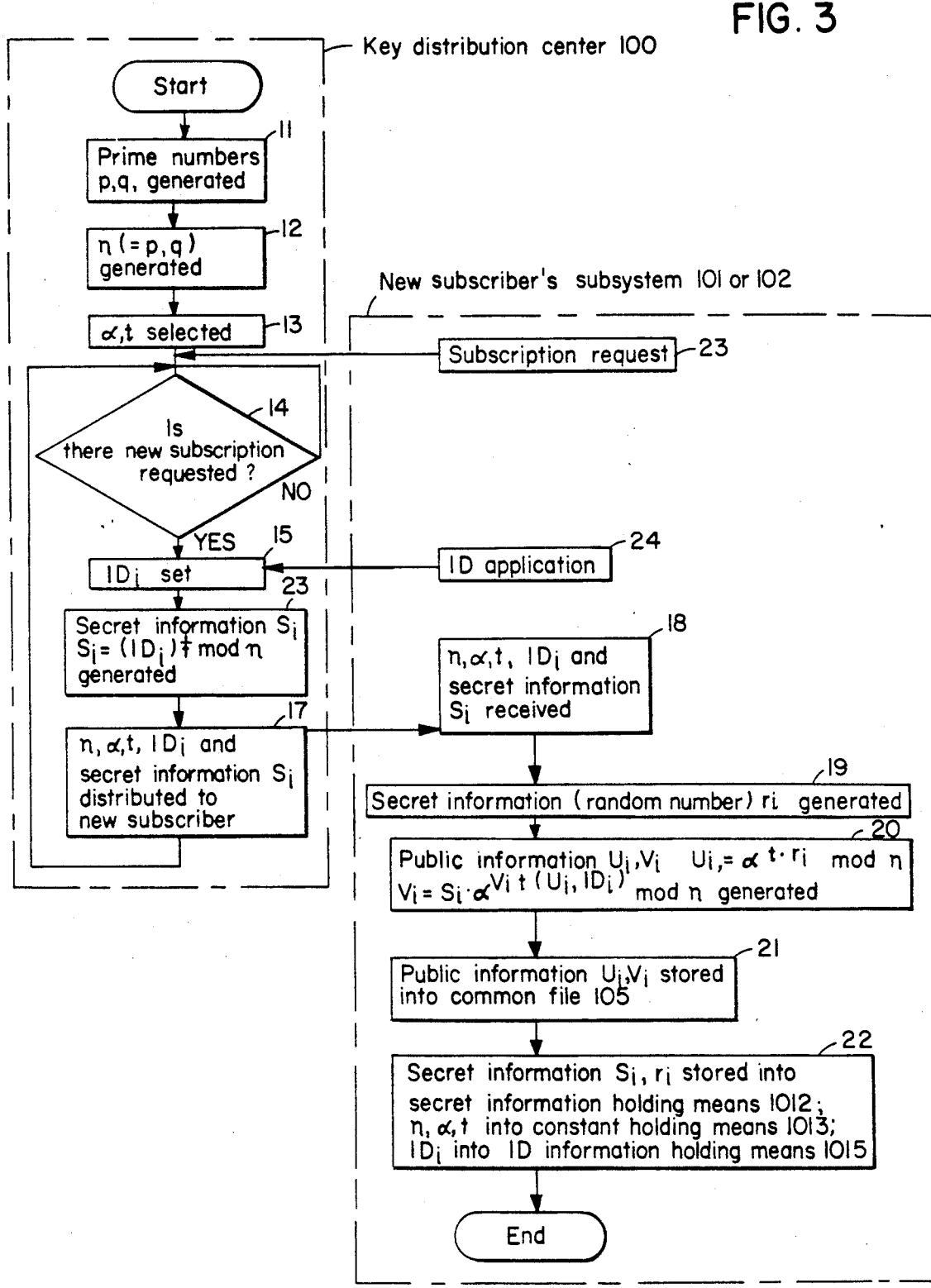
FIG. 3 shows preparatory steps for second, fourth and sixth preferred embodiments of the invention.

Referring to FIGS. 1 and 3, the generated public information $X_i$ is stored into a designated address $ID_i$ in the common file 105. Then the secret information pieces $S_i$ and $r_i$ are stored into secret information holding means 1012, n, $\alpha$ and t are stored into constant holding means 1013 and, at the same time, $ID_i$ is stored into identifying information holding means 1015 (step 22). Steps 11 to 17 are assigned to the key distribution center 100. The identifying information $ID_i$, which is assigned by the center to be different from one communicating party to another, turns generally known pieces of information such as the personal name and address into identifying codes according to, for instance, the ASCII formula.

Now will be described in detail, with reference to FIG. 2, a first preferred embodiment of the present invention in which the public information stored in the common file 105 is accessed by each communicating party.

It is supposed that, in this first preferred embodiment, a sending party A accesses the common file 105, and that, at the key distribution center 100, a conversion formula and a common parameter are set and personal secret information is distributed as shown in FIG. 1. The subsystem 101 generates a random number from random number generating means 1011 and, at the same time, reads out secret information $S_A$ from the secret information holding means 1012 for A and constants d and n from the constant holding means 1013. Then key distribution code $Y_A$ generating means 1014 generates a code $Y_A$ as an intermediate cipher-key in accordance with:

$$Y_A = S_A \cdot \alpha^r (\mod n)$$

The code $Y_A$ generated by the generating means 1014 and identifying information $ID_A$ for A are sent out to the line 104 by transmitting means 1016. Code $Y_A$ receiving means 1022 of the subsystem 102 receives the code $Y_A$ provided via the line 104 and the identifying information $ID_A$. Using the identifying information $ID_A$ and the code $Y_A$ from the receiving means 1022, constants t and n from constant holding means 1021, and secret information $r_B$ from secret information holding means 1028 for B, cipher-key $K_B$ generating means 1023 generates a cipher-key $K_B$ in accordance with:

$$K_B = (Y_A{}^t \cdot ID_A)^{r_B} (\text{mod } n)$$

Here $K_B = \alpha^{r_B t \cdot r} (\text{mod } n)$ because $Y_A{}^t = S_A{}^t \cdot \alpha^r A^t$ $$= (ID_A)^{-1} \cdot \alpha^r A^t (\text{mod } n).$$

There is no need to send second key distributing information from the second subsystem 102 to the subsystem 101 of the sending party A, because public information on the receiving party B is stored in the common file 105 and therefore the subsystem 101 for itself can read out this public information.

Thus the subsystem 101 obtains identifying information $ID_B$ for the receiving party B from outside with input means 1017 and, at the same time, common file reading means 1018 uses this information $ID_B$ to read out public information $X_B$ on B from the common file 105.

Cipher-key generating means 1019, using these pieces of information $ID_B$ and $X_B$, generates a cipher-key $K_A$ in accordance with:

$$K_A = (X_B{}^t \cdot ID_B)^r \text{mod } n$$

Here $K_A = \alpha^{r_B \cdot t \cdot r} \text{ mod } n$ because $X_B{}^t = S_B{}^t \cdot \alpha^{r_B t}$ $$= (ID_B)^{-1} \cdot \alpha^{r_B t} (\text{mod } n).$$

Therefore, the cipher-key $K_A$ generated by the cipher-key $K_A$ generating means 1019 of the subsystem 101 and the cipher-key $K_B$ generated by the cipher-key $K_B$ generating means 1023 of the subsystem 102 become identical, so that key distribution can be achieved.

Thus the sending party A can cipher his message with the subsystem 101 by accessing the common file 105 with the identifying information $ID_B$ for the receiving party B. The key can be generated irrespective of the presence or absence of the receiving party B, and the key distributing code $Y_A$ and the identifying information $ID_A$ can be transmitted together with the ciphered message.

An impostor intending to pretend to be a legitimate communicating party i by altering public information $X_i$ can do so if he finds X and r to satisfy the following equation:

$$X^t \cdot ID_i = \alpha^{tr} \text{mod } n$$

The difficulty to meet this requirement, however, even in collusion with another legitimate party is evident from, for instance, Advances in Cryptology—Crypto '87, pp. 196–202. This literature further explains that, even if said $X_i$ is made public, neither $S_i$ nor $r_i$, both secret information, can be disclosed.

Figure 4:
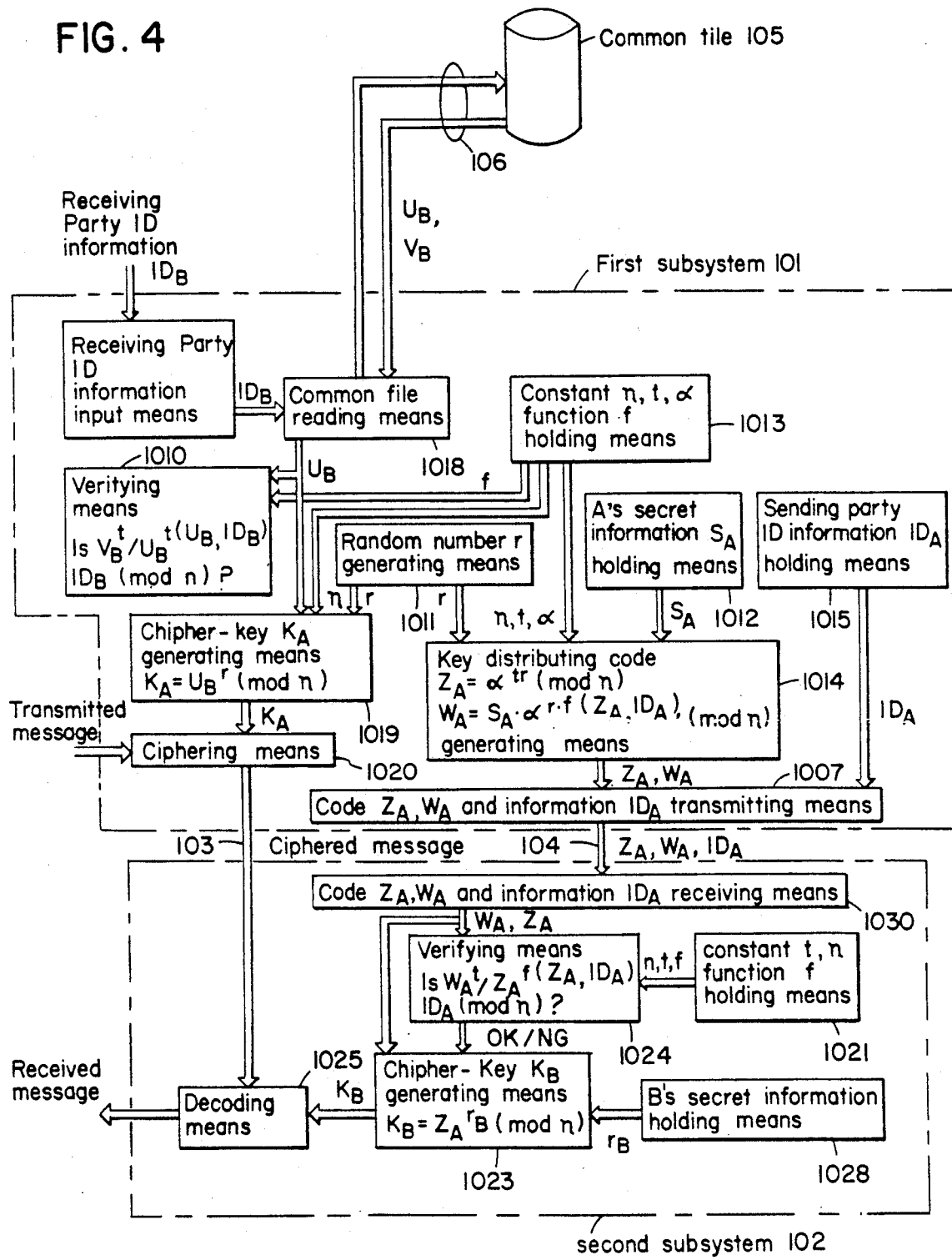
FIG. 4 illustrates the second preferred embodiment of the invention.

Next will be described in detail, with reference to FIG. 4, a second preferred embodiment of the invention, which is characterized by a procedure to verify public information after it is read out.

First, preparatory steps for the execution of this second embodiment will be explained in detail with reference to FIG. 3.

Referring to FIG. 3, first of all, large prime numbers p and q are selected (step 11). Next, the product n of these two large prime numbers p and q is calculated (step 12). Then, t is selected as a number mutually prime to $(p-1) \cdot (q-1)$; $\alpha$ is selected as a positive integer smaller than n, which becomes a primitive element in GF(p) and GF(q), and further is selected a two-variable one-way function f (step 13). After that, either the subsystem 101 or 102 on the part of a new subscriber gives a subscription request 23 as required.

At a key distribution center 100, an inquiry is made as to the presence or absence of a subscription request, and the inquiry is continued until a subscription request is given (step 14). When the inquiry at step 14 finds an affirmative reply, identifying information $ID_i$ for the pertinent subscriber i is set in response to an ID application 24 by the subsystem 101 or 102 (step 15).

Next, by using this identifying information $ID_i$, secret information $S_i$ is figured out by the following equation (step 16):

$$S_i = (ID_i)^{1/t} \text{ mod } n$$

To the new subscriber i are distributed f, n, $\alpha$, t, $ID_i$ and $S_i$, generated at these steps 12, 13 and 16 (step 17).

The system on the part of the new subscriber i receives f, n, $\alpha$, t, $ID_i$ and the secret information $S_i$ distributed at step 17 (step 18). Next, a random number $r_i$ is generated (step 19). Then, on the basis of the received secret information $S_i$, the newly generated secret information (random number) $r_i$ and $\alpha$, which became a primitive element at step 13, pieces of public information $U_i$ and $V_i$ are generated by the following equation (step 20):

$$U_i = \alpha^{t \cdot r_i} \text{ mod } n$$

$$V_i = S_i \cdot \alpha^{f(U_i, ID_i) r_i} \text{ mod } n$$

Referring to FIGS. 1 and 3, the generated public information pieces $U_i$ and $V_i$ are stored into the common file 105. Then the received secret information pieces $S_i$ is stored into secret information holding means 1012, n, $\alpha$ and t are stored into constant holding means 1013 and, at the same time, $ID_i$ is stored into identifying information holding means 1015 (step 22).

Steps 11 to 15 and 23 to 24 are assigned to the key distribution center 100.

Now will be described in detail, with reference to FIG. 4, a second preferred embodiment of the present invention in which the public information stored in the common file 105 is accessed by each communicating party.

It is supposed that, in this second preferred embodiment, a sending party A accesses the common file 105, and that, at the key distribution center 100, a conversion formula and a common parameter are set and personal secret information is distributed as shown in FIG. 3. The subsystem 101 generates a random number from random number generating means 1011 and, at the same time, reads out secret information $S_A$ from the secret information holding means 1012 for A and constants n, t and $\alpha$ from the constant holding means 1013. Then key distribution code $Z_A$ and $W_A$ generating means 1014 generates codes $Z_A$ and $W_A$ as intermediate cipher-keys in accordance with:

$$Z_A = \alpha^{tr} (\text{mod } n)$$

$$W_A = S_A \cdot \alpha^{rf(Z_A, ID_A)} (\bmod\ n)$$

The codes $Z_A$ and $W_A$ generated by the generating means 1014 and identifying information $ID_A$ for A are sent out to the line 104 by transmitting means 1007. Receiving means 1030 of the subsystem 102 receives the codes $Z_A$ and $W_A$ provided via the line 104 and the identifying information $ID_A$. Using the identifying information $ID_A$ and the codes $Z_A$ and $W_A$ from the receiving means 1030, a function f from constant holding means 1021 and the constants t and n, verifying means 1024 checks whether or not $W_A{}^t / Z_A{}^{f(Z_A, ID_A)}$ is equal to $ID_A(\bmod\ n)$.

If the verifying means 1024 verifies the equality, it sends an OK signal to generating means 1023.

In response to this OK signal, the cipher-key generating means 1023, using secret information $r_B$ from holding means 1028, generates a cipher-key $K_B$ in accordance with:

$$K_B = Z_A{}^{r_B} (\bmod\ n)$$

Here, $K_B = \alpha^{r \cdot r_B}(\bmod\ n)$.

There is no need to send second key distributing information from the second subsystem 102 to the subsystem 101 of the sending party A, because public information on the receiving party B is stored in the common file 105 and therefore the subsystem 101 for itself can read out this public information.

Thus the subsystem 101 obtains identifying information $ID_B$ for the receiving party B from outside with input means 1017 and, at the same time, reading means 1018 reads out public information $X_B$ on B from the common file 105 in accordance with this information $ID_B(\bmod\ n)$.

Then, verifying means 1010 checks whether or not $W_B{}^t / U_B{}^{f(U_B, ID_B)}$ is equal to $ID_B(\bmod\ n)$.

If the verifying means 1010 verifies the equality, it sends an OK signal to generating means 1019.

The cipher-key generating means 1019, using the public information $U_B$ provided from reading means 1018, generates a cipher-key $K_A$ in accordance with:

$$K_A = U_B{}^r(\bmod\ n)$$

Here, $K_A = \alpha^{r \cdot r_B}(\bmod\ n)$ because $U_B = \alpha^{r_B} \bmod n$.

Thus is achieved key distribution as the cipher-key $K_A$ generated by the cipher-key $K_A$ generating means 1019 of the subsystem 101 and the cipher-key $K_B$ generated by the cipher-key $K_B$ generating means 1023 of the subsystem 102 become identical.

An impostor intending to pretend to be a legitimate communicating party i by altering public information $U_i$, $V_i$ or key generating information $Z_i$, $W_i$ can do so if he finds X and Y to satisfy the following equation:

$$X^{f(X, ID_i)} ID_i = Y^t \bmod n$$

The difficulty to meet this requirement, however, ever in collusion with another legitimate party is described in, for instance, IEEE Journal on Selected Areas in Communication, Vol. 7, No. 2, pp. 290-294. This literature further explains that, even if said $U_i$, $V_i$ is made public or said $Z_i$, $W_i$ is tapped, neither $s_i$, $r_i$ nor r can be disclosed.

Figure 5:
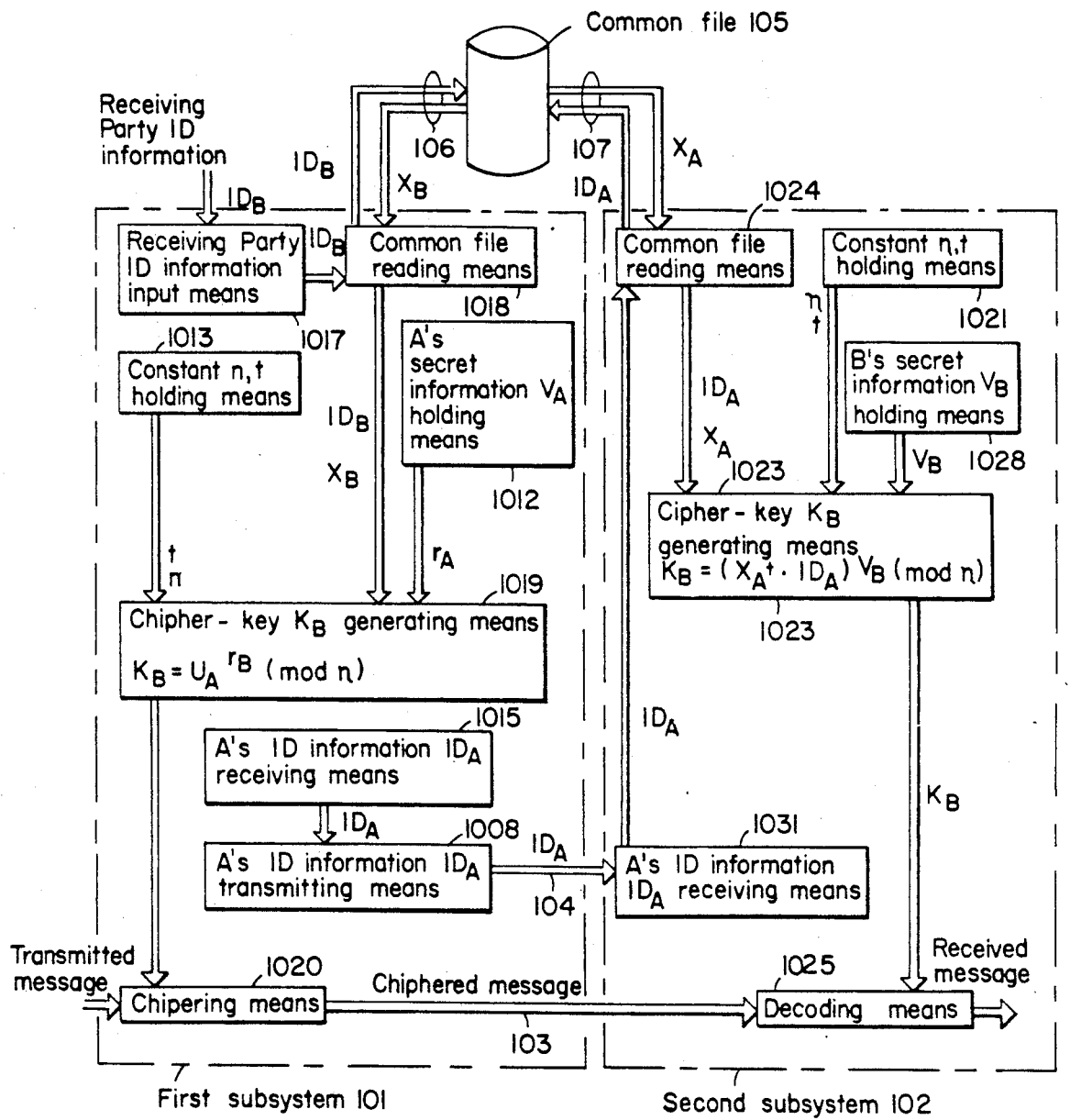
FIG. 5 illustrates the third preferred embodiment of the invention.

Next will be described in detail, with reference to FIG. 5, a third preferred embodiment of the invention, in which both the first subsystem 101 and the second subsystem access the common file 105.

It is supposed that, in this third preferred embodiment, a sending party A and a receiving party B access the common file 105, and that, at the key distribution center 100, a conversion formula and a common parameter are set as shown in FIG. 1. Referring to FIG. 5, identifying information for the receiving party B is entered from input means 1017. In response to this input, common file reading means 1018 reads out public information $X_B$ on B from a position indicated by $ID_B$ in the common file 105. Cipher-key generating means 1019, using secret information $r_A$ from secret information holding means 1012 for A and constants n and t from constant holding means 1013, generates a cipher key $K_A$ in accordance with:

$$K_A = (X_B{}^t \cdot ID_B)^{r_A} \bmod n$$

Here, $K_A = \alpha r_B{}^{t \cdot r_A} \bmod n$ because $X_B{}^t = S_B{}^5 \cdot \alpha^{r_B t} = (ID_B)^{-1} \cdot \alpha r_B(\bmod\ n)$.

Identifying information $ID_A$ from identifying information $ID_A$ holding means 1015 for A is supplied to receiving means 1031 of the subsystem 102 via transmitting means 1008 and a line 104. The information $ID_A$ supplied from the means 1031 is further provided to the common file 105 via reading means 1024 and a line 107. The common file 105 outputs public information $X_A$ from a position indicated by this $ID_A$ and this public information $X_A$, accompanied by $ID_A$ in the reading means 1024, is given to the cipher-key generating means 1023.

The cipher-key generating means 1023, using constants n and t from constant holding means 1021 and secret information $r_B$ from secret information holding means 1028 for B besides these information pieces $X_A$ and $ID_A$, generates a cipher-key $K_B$ in accordance with:

$$K_B = (X_A{}^t \cdot ID_A)^{r_B} \bmod n$$

Therefore, key distribution can be achieved if the cipher-key $K_A$ generated by the cipher-key $K_A$ generating means 1019 of the subsystem 101 and the cipher-key $K_B$ generated by the cipher-key $K_B$ generating means 1023 of the subsystem 102 become identical because:

$$K_A = \alpha^{r_B \cdot r_A} \bmod n = K_B$$

Thus, where both the sending party A and the receiving party B access the common file 105, the subsystem 101 can achieve key distribution merely by adding its own identifying information $ID_A$ to the ciphered message without having to prepare or transmitting a key distribution code.

Figure 6:
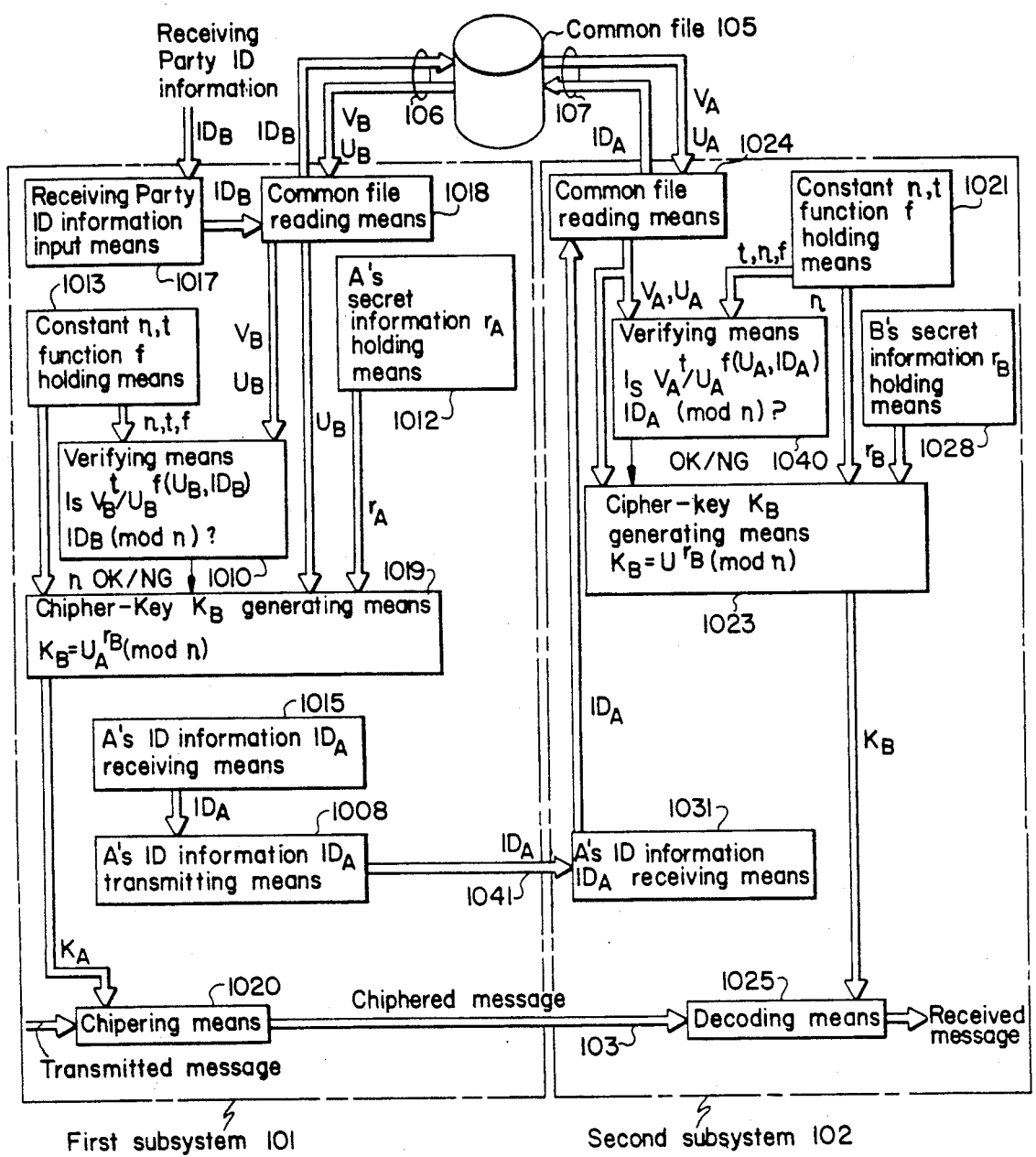
FIG. 6 illustrates the fourth preferred embodiment of the invention.

Next will be described in detail, with reference to FIG. 6, a fourth preferred embodiment of the invention, in which both the first subsystem 101 and the second subsystem access the common file 105.

It is supposed that, in this fourth preferred embodiment, a sending party A and a receiving party B access the common file 105, and that, at the key distribution center 100, a conversion formula and a common parameter are set as shown in FIG. 1. Referring to FIG. 6, identifying information for the receiving party B is entered from input means 1017. In response to this input, common file reading means 1018 reads out public information $U_B$, $V_B$ on B from a position indicated by $ID_B$ in the common file 105.

Verifying means 1010 checks whether or not $V_B U_B{}^{f\text{-}t}(^tB, {}^{ID}B)$ is equal to $^{ID}B \pmod{n}$.

If the verifying means 1010 verifies the equality, it sends an OK signal to cipher-key generating means 1019.

Cipher-key generating means 1019, using secret information $r_A$ from secret information holding means 1012 for A and a constant n from constant holding means 1013, generates a cipher key $K_A$ in accordance with:

$$K_A = U_B{}^{r_A} \bmod n$$

Here, $K_A = \alpha^{rB^{t \cdot r}A} \bmod n$ because $U_B = \alpha^{rB^{t \cdot r}A} \pmod{n}$.

Identifying information $ID_A$ from identifying information $ID_A$ holding means 1015 for A is supplied to receiving means 1031 of the subsystem 102 via transmitting means 1008 and a line 104. The information $ID_A$ supplied from the means 1031 is further provided to the common file 105 via reading means 1024 and a line 107. The common file 105 outputs public information $U_A$, $V_A$ from a position indicated by this $ID_A$ and public information $U_A$, $V_A$, accompanied by $ID_A$ in the reading means 1024, is given to the verifying means 1040.

Verifying means 1040 checks whether or not $V_A{}^{t\text{-}}/U_A{}^{f(U_A, ID_A)}$ is equal to $ID_A \bmod n$.

If the verifying means 1040 verifies the equality, it sends an OK signal to cipher-key generating means 1023.

The cipher-key generating means 1041, using information $U_A$, a constant n from constant holding means 1021 and secret information $r_B$ from secret information holding means 1028 for B generates a cipher-key $K_B$ in accordance with:

$$K_B = U_A{}^{r_B} \bmod n$$

Therefore, key distribution can be achieved if the cipher-key $K_A$ generated by the cipher-key generating means 1019 of the subsystem 101 and the cipher-key $K_B$ generated by the cipher-key generating means 1023 of the subsystem 102 become identical because:

$$K_A = \alpha^{rB^{t \cdot r}A} \bmod n = K_B$$

Next will be described in detail, with reference to FIGS. 7 and 8, a fifth preferred embodiment of the invention.

It is supposed that, at the key distribution center 100, a conversion formula, a common parameter and secret information $S_a$ are set as shown in FIG. 1.

After the preparatory steps shown in FIG. 1, preparations particularly for the fifth embodiment are accomplished as described below.

Figure 7:
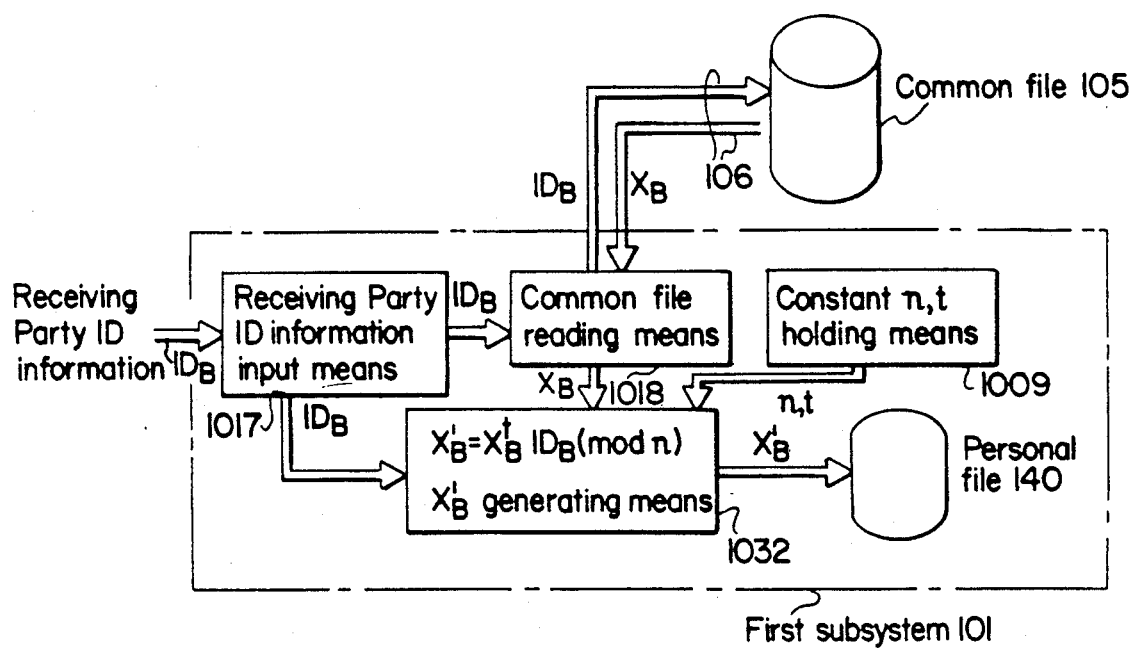
FIG. 7 illustrates the preparation for the fifth preferred embodiment of the invention, taking place after the preparatory steps shown in FIG. 1.

Referring to FIG. 7, identifying information for a receiving party B, with whom a sending party A frequently communicates, is entered from input means 1017. In response to this input, common file reading means 1018 reads out public information $X_B$ on B from a position indicated by $ID_B$ in the common file 105.

$X_B{}'$ generating means 1032, using $X_B$ from reading means 1018 and constants n and t from the constant holding means 1009, converts the public information $X_B$ into an easier-to-handle form in accordance with:

$$X_B{}' = X_B{}^t \cdot ID_B \bmod n$$

and stores $X_B{}'$ into the $ID_B$ address in a personal file 140.

Next will be described the fifth preferred embodiment of the invention in further detail with reference to FIG. 8.

Figure 8:
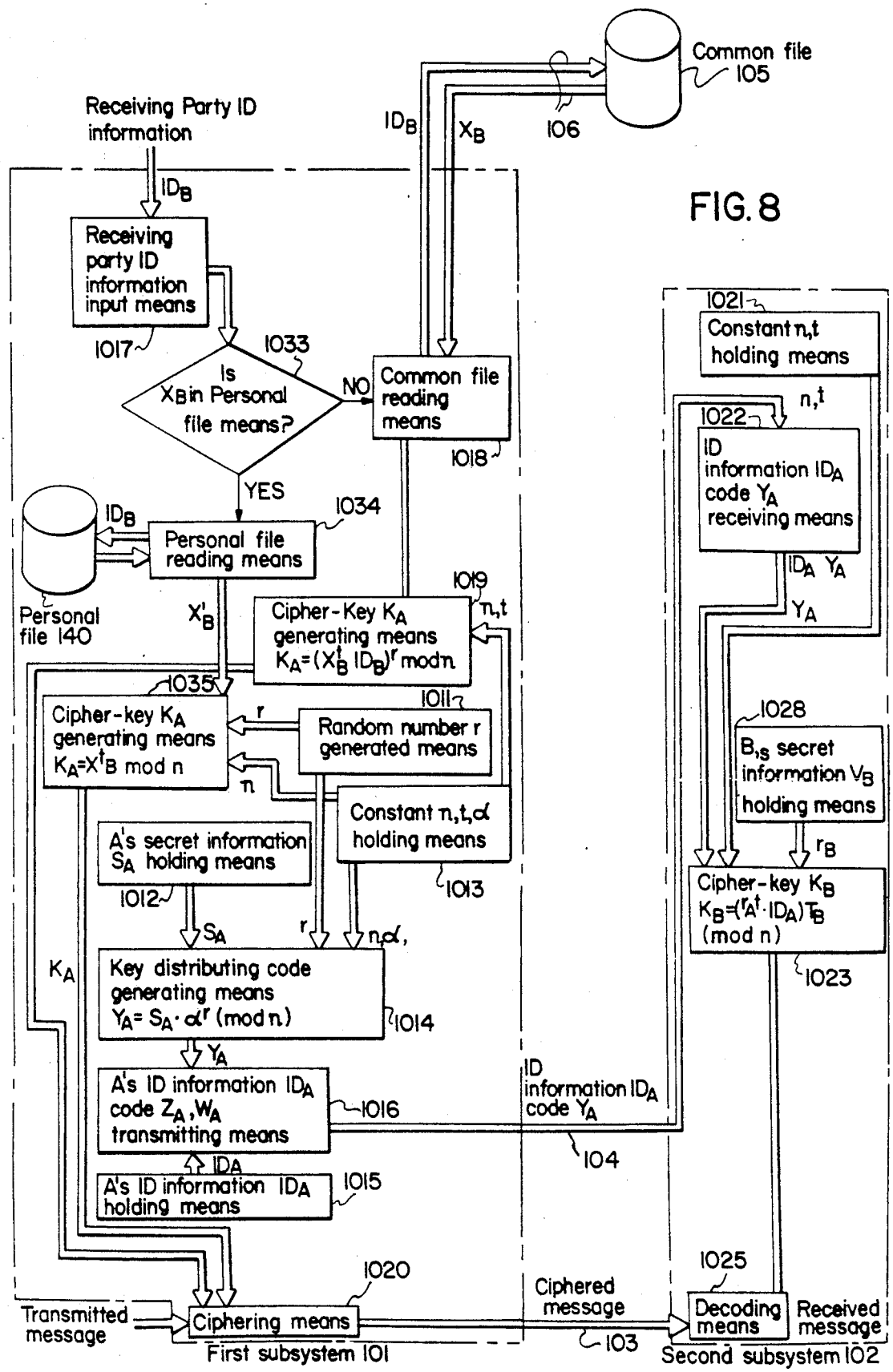
FIG. 8 illustrates the fifth preferred embodiment of the invention.

Referring to FIG. 8, receiving party identifying information input means 1017 enters receiving party identifying information $ID_B$. Then judging means 1033 judges whether or not the converted public information $X_B{}'$ has been stored into the personal file 140. In response to an affirmative judgment, personal file reading means 1034 provides $ID_B$ to read the public information $X_B{}'$ out of the personal file 140. Cipher-key generating means 1035, using a random number r from random number generating means 1011, generates a cipher-key in accordance with:

$$K_A{}' = (X_B{}')^r \bmod n$$

If the judgment by the judging means 1033 is negative, the subsystem 101 obtains public information $X_B$ for the receiving party B from the common file 105 with the common file reading means 1018 as well as externally provided identifying information $ID_B$ for the receiving party B with the input means 1017. The random number generating means 1011 generates the random number r. Cipher-key generating means 1019, using the public information $X_B$ and the identifying information $ID_B$ from the reading means 1018, the random number r from the generating means 1011, and constants n and t from constant holding means 1013, generates a cipher-key $K_A$ in accordance with:

$$K_A = (X_B{}^t \cdot ID_B)^r \bmod n$$

Both the cipher-key generated by the generating means 1035 and that by the generating means 1019 are $K_A = \alpha^{rB^{tr}} \bmod n$. Key distributing code $Y_A$ generating means 1014, after reading out secret information $S_A$ from secret information holding means 1012 for A and the constants n and $\alpha$ from the constant holding means 1013, uses said random number r to generate a key distributing code $Y_A$ in accordance with:

$$Y_A = S_A \cdot \alpha^r \pmod{n}$$

The code $Y_A$ generated by the generating means 1014 and the identify information $ID_A$ for A are sent out to the line 104 by transmitting means 1016. Code $Y_A$ receiving means 1022 of the subsystem 102 receives the code $Y_A$ and the identifying information $ID_A$ for A, both provided via the line 104. Using the identifying information $ID_A$ and the code $Y_A$ from the receiving means 1022, the constants t and n from the constant holding means 1021, and secret information $r_B$ from secret information holding means 1028 for the receiving party B, generating means 1023 generates a cipher-key $K_B$ in accordance with:

$$K_B = (Y_A{}^t \cdot ID_A)^{r_B} \pmod{N}$$

Here, $K_B = \alpha^{rB^{tr}} \pmod{n}$

Therefore, key distribution can be achieved because the cipher-key $K_A$ generated by the cipher-key generating means 1019 and 1035 of the subsystem 101 and the cipher-key $K_B$ generated by the cipher-key generating means 1023 of the subsystem 102 become identical.

Next will be described in detail, with reference to FIGS. 9 and 10, a sixth preferred embodiment of the invention.

First it is supposed that, at the key distribution center 100, a conversion formula, a common parameter and secret information $S_a$ are set as shown in FIG. 1.

Preparations for the sixth embodiment are accomplished as described below.

Figure 9:
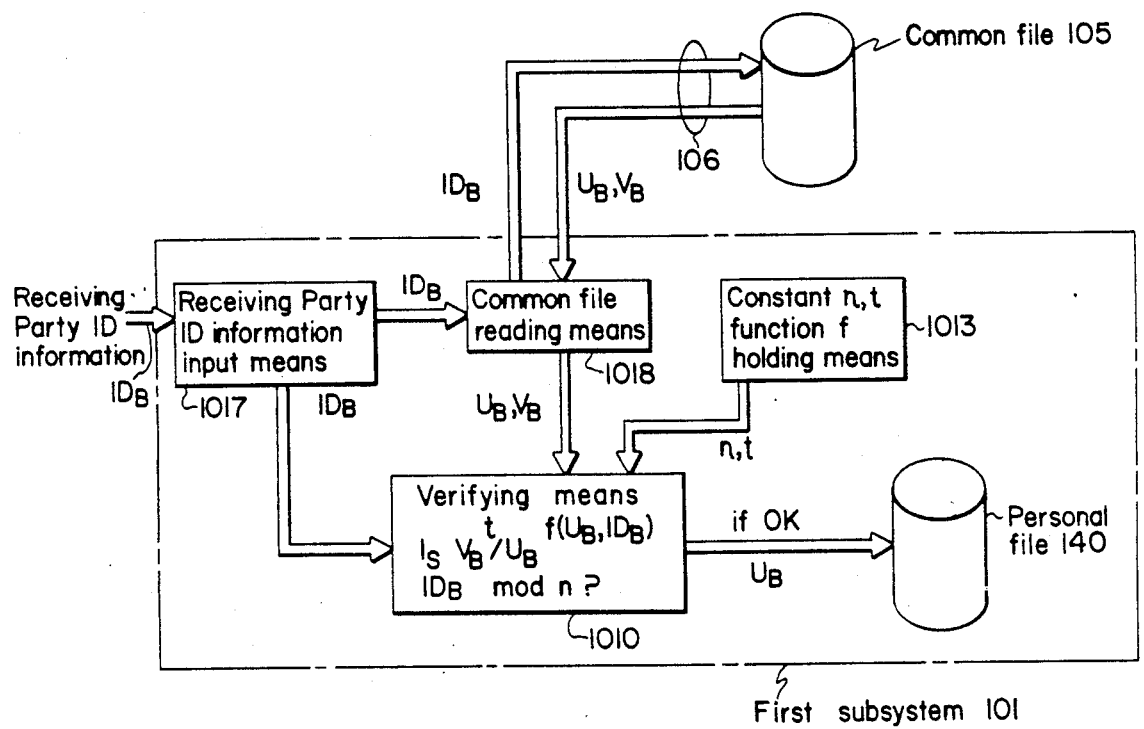
FIG. 9 illustrates the preparation for the sixth preferred embodiment of the invention, taking place after the preparatory steps shown in FIG. 3.

Referring to FIG. 9, identifying information for a receiving party B, with whom a sending party A frequently communicates, is entered from input means 1017. In response to this input, common file reading means 1018 reads out public information $U_B$, $V_B$ on B from a position indicated by $ID_B$ in the common file 105.

Verifying means 1010 checks whether or not $V_B{}^t/U_B{}^{f(U_B, ID_B)}$ is equal to $ID_B$ (mod N).

If the verifying means 1010 verifies the equality, it stores the public information $U_B$ into the $ID_B$ address of the personal file 140.

Next will be described the sixth preferred embodiment of the invention in further detail with reference to FIG. 10.

Figure 10:
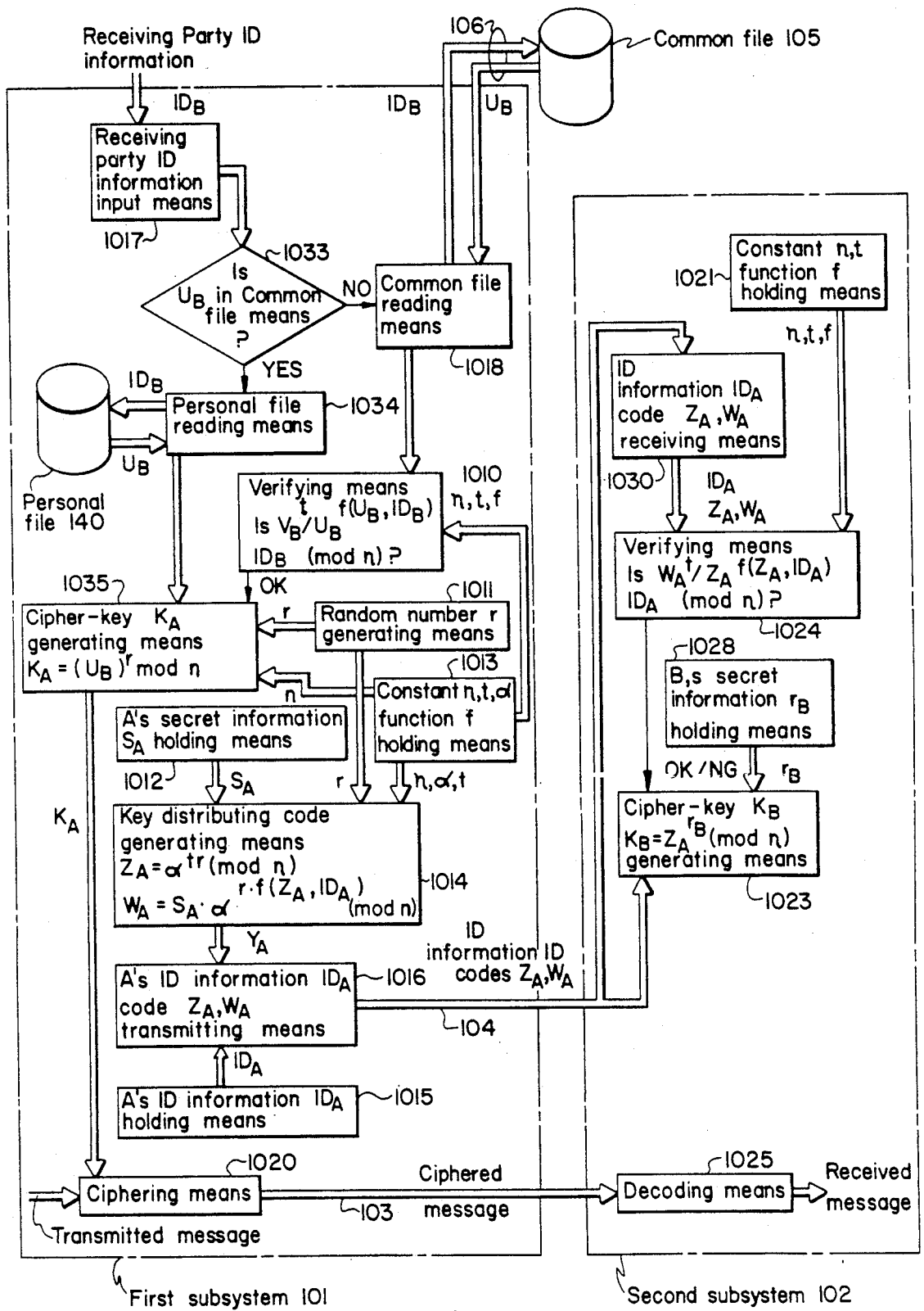
FIG. 10 illustrates the sixth preferred embodiment of the invention.

Referring to FIG. 10, receiving party identifying information input means 1017 enters receiving party identifying information $ID_B$. Then judging means 1033 judges whether or not the public information $U_B$ has been stored into the personal file 140. In response to an affirmative judgment, personal file reading means 1034 provides $ID_B$ to read the converted public information $U_B$ out of the personal file 140. If the judgment by the judging means 1033 is negative, common file reading means 1018 reads public information $U_B$, $V_B$ for B out of a position indicated by $ID_B$ in the common file 105.

Verifying means 1010 checks whether or not $V_B{}^t/U_B{}^{f(U_B, ID_B)}$ is equal to $ID_B$ (mod n).

If the verifying means 1010 verifies the equality, it supplies an OK signal to cipher-key generating means 1035.

The cipher-key generating means 1035, using the random number from the random number generating means 1011, generates a cipher-key in accordance with:

$$K_A = (U_B)^r \bmod n$$

Key distributing code $Z_A$, $W_A$ generating means 1014, using the random number r from the random number generating means 1011, the secret information $S_A$ from secret information holding means 1012, the function f and the constants n, $\alpha$ and t from the constant holding means 1013, generates key distributing codes $Z_A$ and $W_A$ in accordance with:

$$Z_A = \alpha^{tr} \pmod{N}$$

$$W_A = S_A \cdot \alpha^{r \cdot f(Z_A, ID_A)} \pmod{n}$$

The codes $Z_A$ and $W_A$ generated by this generating means 1014 and the identifying information $ID_A$ from holding means 1015 are sent out by transmitting means 1016. The information $ID_A$ and the codes $Z_A$ and $W_A$ transmitted via a line 104 are received by receiving means 1030 of the second subsystem 102 and, at the same time, provided to verifying means 1024.

Verifying means 1024, using the information $ID_A$, the codes $Z_A$ and $W_A$, and the function f and constants n and t from holding means 1021, checks whether or not $W_A/Z_A{}^{f(Z_A, ID_A)}$ is equal to $ID_A$ (mod n).

If the verifying means 1024 verifies the equality, it supplies an OK signal to cipher-key generating means 1023.

In response to this signal, the cipher-key generating means 1024, using $r_B$ from holding means 1028, generates a cipher-key in accordance with:

$$K_B = Z_A{}^{\gamma_B} \pmod{n}$$

Here, $K_B = \alpha^{trr_B}$ (mod n)

Key distribution is made possible because $K_B = \alpha^{trr_B}$ (mod n) $= K_A$.

The fifth and sixth preferred embodiments of the invention are characterized by the presence of the personal file 140 on the first subsystem 101 side. In this file 140 are stored such pieces of information as are frequently used for communication by the first subsystem 101. Other constituent elements of these embodiments are identical with the corresponding ones of the first through fourth embodiments. This personal file 140 contributes to reducing the amount of calculations in the fifth embodiment when generating a key for the other party with whom communication frequently takes place. In the sixth embodiment, it makes possible dispensation with the verifying means for public information on the other party with whom communication frequently takes place.

An example of the subsystems 101 and 102 for use in the first through sixth preferred embodiments will be described below with reference to FIG. 11.

Figure 11:
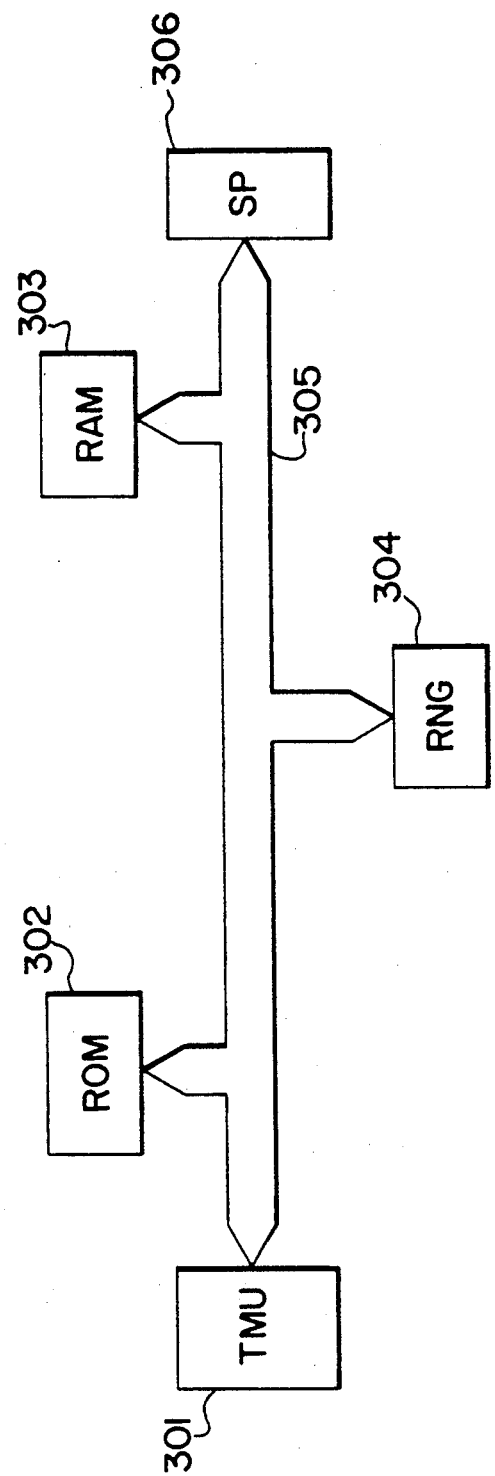
FIG. 11 illustrates the configurations of the first subsystem 101 and the second subsystem 102 shown in FIGS. 2 and 4 through 10.

Referring to FIG. 11, this system comprises a terminal unit (TMU) 301, which may be a personal computer or the like having a function to process communications; a read only memory (ROM) 302; a random access memory (RAM) 303; a random number generator (RNG) 304; a signal processor (SP) 306; and a common bus 305 to connect the TMU 301, ROM 302, RAM 303, RNG 304 and SP 306 with one another.

The RNG 304 may consist of, for instance, the key source 25 disclosed in the U.S. Pat. No. 4,200,700. The SP 306 may be composed of, for instance, a CY1024 Key Management Processor available from CYLINK.

The RNG 304 generates random numbers r upon an instruction from the SP 306. In the ROM 502 are stored public integers t, $\alpha$, n and one-way function f together with a secret integer $S_A$, $\gamma_A$ (for use with the subsystem 101) or $\gamma_B$ (for use with the subsystem 102). $S_A$, $\gamma_A$ and $\gamma_B$ may as well be stored by the user from his TMU into the RAM upon each occasion of communication. The above described actions are realized in accordance with a program stored in the ROM. The RAM 303 is used for temporarily storing the interim results of calculation or the like during the execution of these steps.

Each of the subsystems 101 and 102 may be a data processor of a general-purpose computer or an IC card.

As hitherto described in detail, the present invention provides the benefit of making possible safe unidirectional key distribution immune from attempts in collusion at illegitimate alteration of information.

While this invention has thus been described in conjunction with the preferred embodiments thereof, it will now readily be possible for those skilled in the art to put this invention into practice in various other manners.

What is claimed is:

1. A cipher-key distribution system for distributing a cipher key for use in cipher communication by a first communicating party with a second communicating party, provided with:
- a common file for storing public information in a position indicated by receiving party identifying information, and first and second subsystems, wherein:
- said first subsystem comprises:
- reading means for reading said public information out of said common file;
- random number generating means for generating random numbers;
- first cipher-key generating means for generating a cipher key based on a constant, said receiving party identifying information, a random number generated by said random number generating means and the public information read out by said reading means;
- first secret information holding means for holding a first secret information of said first communicating party using said first subsystem, said first secret information not accessible to said second communicating party;
- key distributing code generating means for generating a key distributing code based on said constant, said random number and the first secret information given from said first secret information holding means; and
- transmitting means for transmitting the key distributing code generated by the key distributing code generating means and information for identifying the first communicating party, and
- said second subsystem comprises:
- receiving means for receiving the key distributing code and the information for identifying the first communicating party from said transmitting means of the first subsystem;
- constant holding means for holding the constant;
- second secret information holding means for holding the second secret information of said second communicating party using said second subsystem, said second secret information accessible only to said second communicating party; and
- second cipher-key generating means for generating a cipher key, which is identical with the cipher-key generated by said first cipher-key generating means, based on the key distributing code and information for identifying the first communicating party from said receiving means, the constant from said constant holding means and the second secret information from said second secret information holding means.

2. A cipher-key distribution system for distributing a cipher key for use in cipher communication by a first communicating party with a second communicating party, provided with:
- common file means for storing public information in a position indicated by receiving party identifying information, and first and second subsystems, wherein:
- said first subsystem comprises:
- first reading means for reading said public information out of said common file means;
- first secret information holding means for holding a first secret information of said first communication party using said first subsystem said first secret information not accessible to said second communicating party;
- first cipher-key generating means for generating a cipher key based on a constant, receiving party identifying information, the public information read out by said first reading means and the first secret information from said first secret information holding means; and
- transmitting means for transmitting information for identifying the first communicating party using this subsystem, and
- said second subsystem comprises:
- receiving means for receiving the information for identifying the first communicating party given from said transmitting means;
- second reading means for reading said public information out of said common file means;
- constant holding means for holding the constant;
- second secret information holding means for holding the second secret information of said second communicating party using said second subsystem said second secret information accessible only to said second communicating party; and
- second cipher-key generating means for generating a cipher key, which is identical with the cipher-key generated by said first cipher-key generating means, based on the constant from said constant holding means, the second secret information from said second secret information holding means, the public information given from said second reading means, and said information for identifying the first communicating party from said receiving means.

3. The cipher-key distribution system for distributing a cipher key for use in cipher communication by a first communicating party with a second communicating party, as claimed in claim 1, wherein the first subsystem further has a personal file for storing part of the public information stored in the common file.

4. The cipher-key distribution system for distributing a cipher key for use in cipher communication by a first communicating party with a second communicating party, as claimed in claims 1, 2 or 3, wherein the first subsystem further has verifying means for verifying the public information read out of the common file.

5. The cipher-key distribution system for distributing a cipher key for use in cipher communication by a first communicating party with a second communicating party, as claimed in claims 1 or 3, wherein the second subsystem further has verifying means for verifying the information received from said first subsystem.

* * * * *